3,201,417
NOVEL SULTONES FROM HEXAHALOBICYCLO-(2.2.1)HEPTADIENES

Edward D. Weil, Lewiston, N.Y., assignor to Hooker Chemical Corporation, Niagara Falls, N.Y., a corporation of New York
No Drawing. Filed Oct. 17, 1962, Ser. No. 231,282
10 Claims. (Cl. 260—327)

This invention comprises new and useful halogenated polycyclic sultones and methods for manufacture thereof.

The reactions of oleum or sulfuric acid with highly halogenated cyclic hydrocarbons have been known to produce polyhalogenated ketones with concomitant release of hydrogen halide. Therefore, the reactions of the invention are unexpected in that they proceed substantially without evolution of hydrogen halide and yield sultones.

It has now been found that the reaction of a hexahalobicyclo(2.2.1)heptadiene of the structure:

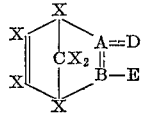

where X is halogen, preferably chlorine, where A and B are carbon atoms, where D is a radical chosen from the group consisting of hydrogen, alkyl, and alkylidene radicals, and where E is a radical chosen from the group consisting of hydrogen and alkyl; A and B being connected by a double bond when D is monovalent (hydrogen or alkyl) and by a single bond when D is divalent (alkylidene), with a compound chosen from the group consisting of sulfuric anhydride and oleum, yields a sultone having the empirical formula identical to the empirical formula of the organic starting material plus the elements of sulfur trioxide.

The radicals D and E may be alkyl groups of any chain length, but lower alkyl, i.e., up to eight carbons, is preferred. Likewise, D may be an alkylidene radical of any length, branched or unbranched, but lower alkylidene, up to eight carbon atoms, is preferred. Suitable starting materials and the products formed therefrom include the following:

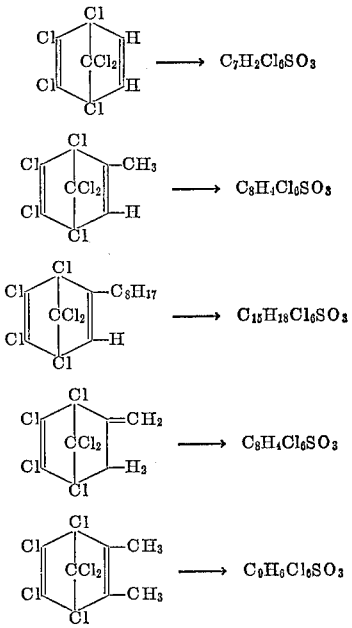

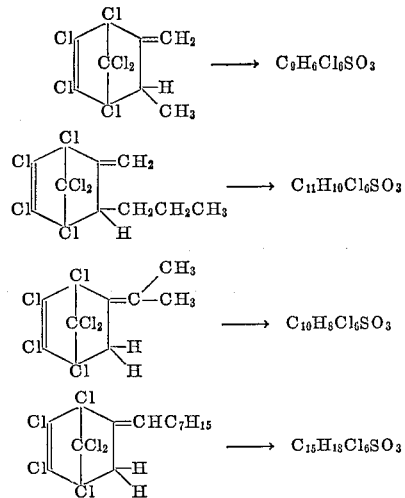

The products are described by the generic formula $C_nH_{2n-12}Cl_6SO_3$. In all cases, the infrared spectrum shows the presence of the —O—SO$_2$— group, and the lack of acidic properties establishes the absence of the HO—SO$_2$— group, thereby establishing the products as sultones.

Because of the presence of two double bonds in the starting material, either or both of which can be involved in the reaction of the addition of the —SO$_2$—O— bridge, a generic structure cannot reliably be written. However, in the case of the product of 1,2,3,4,7,7-hexachlorobicyclo(2.2.1)heptadiene-2,5 plus oleum or sulfuric anhydride, the product is believed to have the structure:

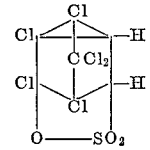

since the infrared spectrum shows no double bond and a band is present at 1044 cm.$^{-1}$ similar to the cyclopropane band of 1,2-dichlorocyclopropane.

The reactions are preferably conducted by admixture of the organic starting material with liquid oleum or with gaseous or liquid sulfur trioxide. By oleum is meant sulfuric acid containing free sulfuric anhydride (sulfur trioxide). Sulfur trioxide may be employed in the pure form or complexed with an electron donor (Lewis base) such as chloroethyl ether or dioxane to moderate the reaction and to facilitate handling. A reagent equivalent to oleum may also be employed by admixing a strong dehydrating agent such as phosphorus pentoxide or acetic anhydride with concentrated sulfuric acid in amounts sufficient to combine with all of the free water present plus part of the water combined in the sulfuric acid molecules.

The reactions of the invention may be conducted by merely admixing the reactants in the temperature range from about —40° C. to +150° C. At lower temperatures than such, the reaction is very sluggish; at higher temperatures, undesirable side reactions predominate. The admixture may be conducted by adding either reactant to the other. Where sulfur trioxide is employed as one reactant, it may be added either as liquid, as solid polymeric SO$_3$ or as gaseous SO$_3$.

A solvent is not required, it being convenient to employ an excess of one or another reactant as solvent. However, a non-reactant solvent may be employed, for example, a saturated hydrocarbon such as hexane or cyclohexane, an aromatic hydrocarbon having a low rate of sulfonation, such as benzene; a chlorinated hydrocarbon such as ethylene dichloride or dichlorobenzene, an ether such as diisopropyl ether or dioxane, os a nitrohydrocarbon such as nitromethane or nitrobenzene, or an anhydride such as acetic anhydride. The last-named type of solvent may also serve in the double role of dehydrating agent for the sulfuric reagent where said sulfuric reagent contains water.

The reaction is conveniently carried out at or near atmospheric pressure, but is also operable at sub or superatmospheric pressure. The products of the reaction may be isolated by conventional means such as filtration, extraction, distillation, or sublimation. At suitable concentrations, they will crystallize from the reaction medium and may be isolated by filtration. They may in general be induced to crystallize by dilution of the reaction medium with water and/or cooling. Alternatively, the sultones, being soluble in most organic solvents, may be isolated and separated from impurities such as excess sulfuric acid, by-product sulfonic acids, and the like, by extraction from the reaction mixture by organic solvents. Suitable solvents are, for example, those named above as reaction solvents. The products may be further purified by washing with water, by recrystallization from solvents, by sublimation, and other means known to the art for purification of organic compounds.

The products of the reaction are useful as chemical intermediates, as flame-retardant additives for resins, and as textile treating agents to introduce flame retardancy.

As indicated above, the compositions of this invention exhibit pesticidal activity, and are particularly outstanding as fungicides. They also possess certain insecticidal activity such as toxicity toward mites and the like, and are active also against bacteria and marine fouling organisms. In addition, the compositions of the invention, their halogenation products, thermal decomposition products, hydrogenation products, adducts and products in which the sultone ring has been cleaved or opened by nucleophilic reagents are useful as pesticides, as intermediates for preparing pesticides, or for organic synthesis generally.

In addition to their major advantages of biocidal activity and their availability as biocidal intermediates and chemical intermediates, this invention in its composition aspect offers other additional major advantages.

For example, these compositions due to their unique probable structure, stability and solubility in a variety of organic solvents lend themselves to formulation in diverse forms ranging from the simple to the complex. The invention compositions may be utilized as biocides, particularly as fungicides and miticides in the pure form or as reaction crudes. Where they are to be used as intermediates, the purified product is often both necessary and desirable.

The pesticidal preparations are conveniently made up as liquid or as solid formulations. Examples of solid formulations are dusts, wettable powders, granules and pellets. Each of these may contain one or more of the invention compositions combined with a solid carrier or extender, ordinarily a non-reacting or inert substance such as sand, clays, talcs, sawdust, flours, alkaline earth carbonates, oxides, phosphates, and the like as well as diatomaceous earths, micas and similar suitable materials.

Where liquid formulations are desirable, liquid extenders, diluents or carriers of a non-reactive nature are utilized. Examples of such materials are aliphatic alcohols, chlorocarbons, ketones and glycols, aromatic hydrocarbons, petroleum fractions and distillates among many others.

Where it is desired to use the aforementioned wettable powders, or liquid formulations either emulsified, dispersed or suspended in water or other fluid, one or more of a class of materials herein referred to as adjuvants may be incorporated into the powder, dust, or liquid formulation. These materials comprise surface active agents, detergents, wetting agents, solubilizing agents, stabilizers, dispersing agents, suspending agents, emulsifying agents, spreaders, stickers, and conditioning agents generally. These materials through their modifying characteristics facilitate handling and application, and not infrequently enhance or potentiate the compositions of this invention of their pesticidal activity by mechanisms frequently not well understood.

A satisfactory but not exhaustive list of these substances appears among other places in "Soap and Chemical Specialties," volume 31, No. 7, page 61; No. 8, pages 48–61; No. 9, pages 52–67 and No. 10, pages 38–67 (1955). Also, see Bulletin E–607 of the Bureau of Entomology and Plant Quarantine of the United States Department of Agriculture.

An additional advantage of the instant compositions is their compatibility with a variety of biocidal materials. For example, it may frequenty be convenient to combine one or more compositions of this invention with one or more adjuvants and carriers with insecticidal materials such as chlordane, benzene hexachlorides, DDT, DDD, the insecticidal carbamates, polychlorinated terpenes, the parathions, methoxychlor, insecticidal phosphates, phosphorothioates, and phosphorodithioates, with other fungicides such as sulfur, quinones, dodecylguanidine, the metal dimethyldithiocarbamates, N-trihalomethylthio-4 - cyclohexene-1,2-dicarboximide, N - (trichloromethylthio) phthalimide, heptadecylimidazoline, dinitrocapryl crotonate and various fungicidal zinc, iron, nickel, manganese, copper, lead and mercury salts.

In respect to pesticidal use (fungcidal and/or insecticidal), the preferred method of employing the novel sultones of this invention is to apply the compounds or a formulation thereof to the site of the crop to be protected or to the soil, seeds, roots, foliage, branches or fruit. While the precise rates of application depend upon the type and degree of rates of from 0.1 to 10 pounds per acre will generally be suitable in foliar application, lower rates in seed application down to one ounce per acre, with higher rates, up to and above one hundred pounds per acre in soil application. While the emphasis in this application has been primarily that of fungicidal treatment of plants, the compounds of this invention used serve equally well as an antimicrobial agent in wood, paper, cloth, leather, stored food products, pulp, plastics, paints and other substances susceptible to deterioration due to microorganisms, and will generally be used at 0.1 p.p.m. or higher, in the medium to be treated. The compounds also have utility in paints, varnishes, and other coatings for prevention of attack by fungi, mildew, marine fouling organisms, and the like.

The following additional examples are submitted to more clearly illustrate the workings of this invention. Except as indicated in the claims, none of the submitted exemplification is to be construed as limitations of this invention in its composition and process aspects.

*Example 1*

Ten parts of 1,2,3,4,7,7-hexachlorobicyclo(2.2.1)heptadiene-2,5 and 30 parts of oleum (20% sulfur trioxide) were stirred and warmed to 80°. After 15 minutes, the reaction mixture partly solidified. After cooling, it was poured into ice water, the precipitated solids were filtered out and washed with water. The crude solid product was recrystallized from heptane to obtain 6 parts of colorless needles, M.P. 173.5–174°.

*Analysis.*—Calcd. for $C_7H_2O_3Cl_6S$: C, 22.19; H, 0.53; Cl, 56.15; S, 8.46, mol. wt. 379. Found: C, 22.29; H, 0.66; Cl, 56.4; S, 8.46; mol. wt. 357± 10%.

The infrared spectrum shows bands characteristic of the —$SO_2$—O— linkage, and no bands in the C=C stretching region.

*Example 2*

To 500 parts of oleum (20% sulfur trioxide) was added 100 parts of 5-methylene-1,2,3,4,7,7-hexachlorobicyclo(2.2.1)-heptene-2 with stirring and cooling to hold the temperature below 50°. After stirring for 30 minutes, the thickened mixture was poured into ice water, The precipitated solid was extracted with methylene chloride, the extract was washed with water, dried over magnesium sulfate, filtered, and diluted with carbon tetrachloride. Upon partial evaporation, 83 parts of colorless crystalline product, M.P. 185–187.5° was obtained as a precipitate. This product, after recrystallization from methylene chloride-carbon tetrachloride, melted at 192.5°.

Analysis—Calcd. for $C_8H_4Cl_6SO_3$: C, 24.35; H, 1.27; Cl, 54.0; S, 8.11, mol. wt. 393. Found: C, 24.35; H, 1.36; Cl, 54.7; S, 7.98; mol. wt. 423±10%.

Example 3

In a manner similar to Example 1, ten parts of 2-methyl - 1,4,5,6,7,7-hexachlorobicyclo(2.2.1)heptadiene-2,5 and 30 parts of oleum were reacted to produce a non-acidic solid product having the correct analysis for $C_8H_4Cl_6SO_3$ and showing bands characteristic of the —$SO_2$—O— linkage in the infrared spectrum.

Example 4

In a manner similar to Example 1, ten parts of 2,3-dimethyl -1,4,5,6,7,7-hexachlorodicyclo(2.2.1)heptadiene-2,5 (prepared by heating together hexachlorocyclopentadiene and dimethylacetylene in a sealed tube at 150°) and 30 parts of oleum are reacted to obtain a non-acidic colorless solid having the correct elemental analysis for $C_9H_6Cl_6SO_3$ and showing infrared bands characteristic of the —$SO_2$—O— group.

Example 5

A pesticidal wettable powder formulation of the sultone $C_8H_4Cl_6SO_3$ (of Example 2) was prepared by grinding together the following ingredients:

| | Parts by weight |
|---|---|
| Sultone $C_8H_4Cl_6SO_3$ | 50 |
| Attapulgus clay | 43 |
| Lignin sulfonate dispersing agent | 5 |
| Sodium alkylaryl sulfonate wetting agent | 2 |

Example 6

An emulsifiable formulation of the sultone $C_9H_6Cl_6SO_3$ (Example 4) was prepared by blending the following ingredients:

| | Lbs. |
|---|---|
| Sultone $C_9H_6Cl_6SO_3$ | 2 |
| Toximul S commercial polyoxyethylene ether | 0.04 |
| Toximul R alkylaryl sulfonate wetting agents | 0.04 |
| Xylene, to make 1 gal. total volume. | |

Example 7

Tomato plants infested with spores of *Alternaria solani* (the causative fugal pathogen of early blight disease) were sprayed at various concentrations with the chemicals of the invention. Several infested plants were left unsprayed for comparison. About two weeks later, when the unsprayed plants were exhibiting numerous leaf lesions characteristic of the disease, the control of the disease (reduction in number of lesions) was estimated on the treated tomato plants. The results are as follows:

| Chemical | Disease Control (Percent, Relative to Untreated) | |
|---|---|---|
| | 400 p.p.m. | 100 p.p.m. |
| Product of Example 2 | 100 | 100 |
| Product of Example 1 | 100 | 61 |

Having described the invention and given its advantages, what is claimed is:

1. A sultone of empirical formula $C_nH_{2n-12}Cl_6SO_3$, wherein $n$ is from 7 to 23, prepared by the reaction of the starting compound of the formula:

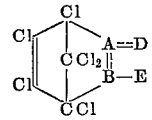

wherein A and B are carbon atoms, D is selected from the group consisting of hydrogen, lower alkyl and lower alkylidene, E is selected from the group consisting of hydrogen and lower alkyl, A and B being connected by a double bond when B is monovalent and by a single bond when B is divalent, and having a total of $n$ carbon atoms, with a compound selected from the group consisting of sulfuric anhydride and oleum.

2. A sultone of empirical formula $C_7H_2Cl_6SO_3$, prepared by the reaction of 1,2,3,4,7,7-hexachlorobicyclo-(2.2.1)heptadiene-2,5, with a compound selected from the group consisting of sulfuric anhydride and oleum, characterized by the fact that it is soluble in heptane and crystallizable therefrom in colorless needles, having a melting point of about 173.5 degrees to 174 degrees centigrade.

3. A sultone of empirical formula $C_8H_4Cl_6SO_3$, prepared by the reaction of 5-methylene-1,2,3,4,7,7-hexachlorobicyclo(2.2.1)heptene-2 with a compound selected from the group consisting of sulfuric anhydride and oleum, characterized by the fact that it is a colorless crystalline material, soluble in a methylene chloride-carbon tetrachloride solvent and having a melting point of about 192.5 degrees centigrade.

4. A sultone of empirical formula $C_8H_4Cl_6SO_3$, prepared by the reaction of 2-methyl-1,4,5,6,7,7-hexachlorobicyclo(2.2.1)heptadiene-2,5, with a compound selected from the group consisting of sulfuric anhydride and oleum.

5. A sultone of empirical formula $C_9H_6Cl_6SO_3$, prepared by the reaction of 2,3-dimethyl-1,4,5,6,7,7-hexachlorobicyclo(2.2.1)heptadiene-2,5, wth a compound selected from the group consisting of sulfuric anhydride and oleum.

6. A method of making a sultone of empirical formula $C_nH_{2n-12}Cl_6SO_3$ in which $n$ is from 7 to 23, which comprises reacting together:

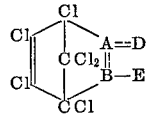

wherein A and B are carbon atoms, D is selected from the group consisting of hydrogen, lower alkyl and lower alkylidene, E is selected from the group consisting of hydrogen and lower alkyl, A and B are connected by a double bond when D is monovalent and by a single bond when D is divalent, and having a total of $n$ carbon atoms, with a compound selected from the group consisting of sulfuric anhydride and oleum.

7. A method of making a sultone of empirical formula $C_7H_2Cl_6SO_3$ which comprises reacting 1,2,3,4,7,7-hexachlorobicyclo(2.2.1)heptadiene-2,5, with a compound selected from the group consisting of sulfuric anhydride and oleum.

8. A method of making a sultone of empirical formula $C_8H_4Cl_6SO_3$, which comprises reacting 5-methylene-1,2,3,4,7,7 - hexachlorobicyclo(2.2.1)heptene - 2 with a compound selected from the group consisting of sulfuric anhydride and oleum.

9. A method of making a sultone of empirical formula $C_8H_4Cl_4SO_3$ which comprises reacting 2 - methyl - 1,4,5,6,7,7-hexachlorobicyclo(2.2.1)heptadiene-2,5, with a compound selected from the group consisting of sulfuric anhydride and oleum.

10. A method of making a sultone of empirical formula $C_9H_6Cl_6SO_3$ which comprises reacting 2,3-dimethyl - 1,4,5,6,7,7 - hexachlorobicyclo(2.2.1)heptadiene-2,5, with a compound selected from the group consisting of sulfuric anhydride and oleum.

References Cited by the Examiner

UNITED STATES PATENTS 3,086,907  4/63  Hessel _____ 167—33
3,105,081  9/63  Kimball et al. _____ 260—327

OTHER REFERENCES

Mustafa: Chem. Reviews, vol. 54, No. 2, page 198.

IRVING MARCUS, *Primary Examiner.*
NICHOLAS S. RIZZO, *Examiner.*

UNITED STATES PATENT OFFICE
CERTIFICATE OF CORRECTION

Patent No. 3,201,417  
August 17, 1965

Edward D. Weil

It is hereby certified that error appears in the above numbered patent requiring correction and that the said Letters Patent should read as corrected below.

Column 3, line 2, for "os" read -- or --; column 4, line 16, for "frequenty" read -- frequently --; column 5, line 24, for "hexachlorodicyclo" read -- hexachlorobicyclo --; line 55, for "fugal" read -- fungal --; column 6, lines 12 and 13, for "B", each occurrence, read -- D --; line 40, for "wth" read -- with --.

Signed and sealed this 27th day of September 1966.

(SEAL)  
Attest:

ERNEST W. SWIDER  
Attesting Officer

EDWARD J. BRENNER  
Commissioner of Patents